United States Patent [19]
Frank

[11] Patent Number: 5,914,948
[45] Date of Patent: Jun. 22, 1999

[54] MOBILE RADIO SYSTEM WITH TIME-DIVISION MULTIPLEXING

[75] Inventor: Matthias Frank, Borkheide, Germany

[73] Assignee: Alcatel N.V., Rijswijk, Netherlands

[21] Appl. No.: 08/724,887

[22] Filed: Oct. 3, 1996

[30] Foreign Application Priority Data

Oct. 5, 1995 [DE] Germany ............... 195 37 044

[51] Int. Cl.⁶ .................................................. H04J 3/16
[52] U.S. Cl. ..................... 370/337; 370/395; 455/562
[58] Field of Search ................................. 370/310, 314,
370/321, 326, 329, 330, 336, 337, 345,
347, 442, 465, 464, 468, 498, 535, 536,
537, 538, 539, 540, 541, 542, 543, 544,
545, 331, 332, 333, 334; 375/201; 455/436,
437, 438, 439, 440, 441, 442, 443, 444,
462, 463, 464, 7, 11.1, 12.1, 13.1, 13.2,
13.3, 25, 562

[56] References Cited

U.S. PATENT DOCUMENTS

| | | | |
|---|---|---|---|
| 3,864,524 | 2/1975 | Walker | 370/538 |
| 4,659,878 | 4/1987 | Dinkins | 455/11.1 |
| 4,891,805 | 1/1990 | Fallin | 370/538 |
| 5,260,967 | 11/1993 | Schilling | 375/205 |
| 5,267,261 | 11/1993 | Blakeney, II et al. | 455/442 |
| 5,355,368 | 10/1994 | Dore et al. . | |
| 5,410,587 | 4/1995 | Grunwell | 455/11.1 |
| 5,434,859 | 7/1995 | Levardon | 370/349 |
| 5,490,136 | 2/1996 | Sereno et al. | 370/342 |
| 5,600,633 | 2/1997 | Jaisingh et al. | 370/395 |

FOREIGN PATENT DOCUMENTS

| | | |
|---|---|---|
| 0618688 | 3/1994 | European Pat. Off. . |
| 0671824 | 9/1995 | European Pat. Off. . |
| 4222237 | 1/1994 | Germany . |
| 4225582 | 2/1994 | Germany . |
| 4310645 | 10/1994 | Germany . |

OTHER PUBLICATIONS

Swoboda, Joachim, "Codierung zur Fehlerkorrektur und Fehlererkennung", R. Oldenbourg Ver lag, Munchen, Wien 1973, S. 101, 102.

Finger, Adolf, Digitale Signalstrukturen in der Informationstechnik, R. Oldenbourg Ver lag, Munchen, Wien 1985, S. 156, 157.

"The GSM" by M. Mouly and M.B. Pautet, published in 1992, pp. 195–203.

"Synchrone Digitalhierarchie und asynchroner Transfermodus", Telekom Praxis, published by Siemens AG, Munich Apr. 1994, pp. 29–36.

*Primary Examiner*—Huy D. Vu
*Attorney, Agent, or Firm*—Milton Oliver; Ware, Fressola, Van Der Sluys & Adolphson LLP

[57] ABSTRACT

A mobile radio system that permits broadband radio transmission in which a mobile station (MS) can be assigned a plurality of subscriber channels (TCH) of different widths. To accomplish this, concentrators (SMX) are connected to the base stations (BS, BS') of the mobile radio system and to the mobile station (MS). These concentrators (SMX) operate in an asynchronous transfer mode to combine a plurality of subscriber channels (TCH) into one transmit channel (DL) by statistical time-division multiplexing and to separate a receive channel (UL) into the plurality of subscriber channels (TCH) by statistical time-division demultiplexing. This provides a broadband wireless link between the mobile station and the base stations which is characterized by a flexible number of subscriber channels that can have different widths. In one embodiment of the mobile radio system according to the invention, the base stations (BS, BS') operate in a common-channel mode and are connectable with the mobile station (MS) via directional radio links (P, P'). Through this combination of common-frequency working, directional radio, and ATM, the invention can be used to advantage in the mobile radio field.

9 Claims, 1 Drawing Sheet

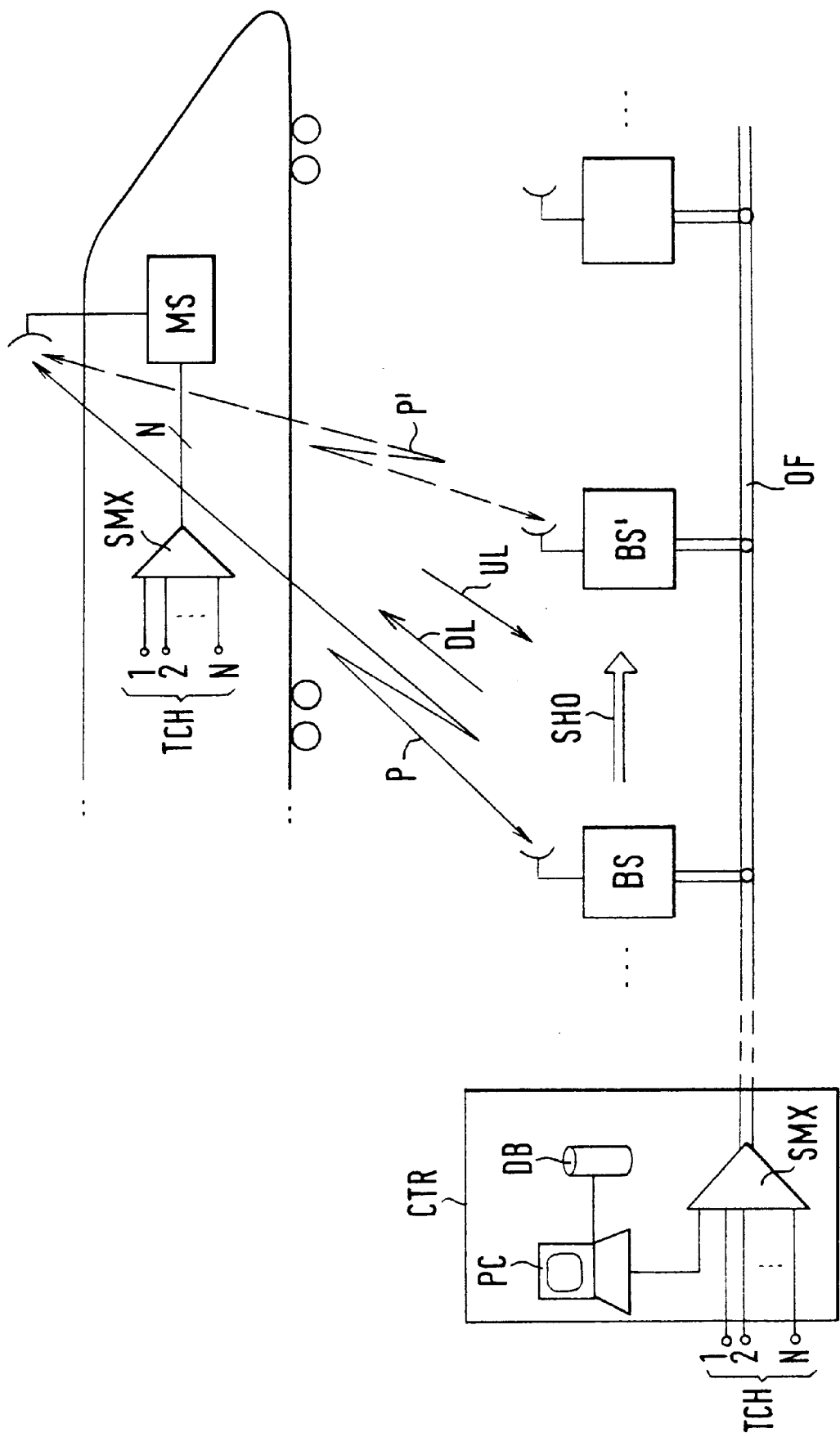

MOBILE RADIO SYSTEM WITH TIME-DIVISION MULTIPLEXING

TECHNICAL FIELD

The present invention relates to a mobile radio system comprising base stations and a mobile station which is connected with one of the base stations via a radio link as well as to a base station and a mobile station therefore.

BACKGROUND OF THE INVENTION

In known mobile radio systems, such as the GSM (Global System for Mobile Communications), each mobile station is assigned only one subscriber. Thus, each mobile station can only be used by a single subscriber. In the GSM, uniform bandwidths are fixed for the subscriber channels (see, for example, pages 195 to 203 of a book by M. Mouly and M.-B. Pautet entitled "The GSM", published by the authors in 1992, 49 rue Louise Bruneau, Palaiseau, France). For each subscriber channel, either a bandwidth of 25 kHz is made available in the so-called full-rate mode (with 8 TDMA channels in a 200-kHz band) or a bandwidth of 12.5 kHz is made available in the so-called half-rate mode (with 16 TDMA channels).

DE-OS 42 22 237, Hupperrich et al. discloses a mobile radio system for serving an area along a supply route, particularly along a railroad line. In that system, which is designed for many subscribers, a mobile station installed in a train is connectable via a directional radio link with base stations arranged along the railroad line. The system is a cellular system, so that different carrier frequencies must be provided for adjacent base stations, which necessitates complicated and costly radio network planning. In the mobile radio system, which is preferably designed according to the GSM standard, each mobile station is assigned only a single subscriber channel (TDMA time slot). How several subscriber channels can be made available simultaneously for the passengers on the train and for train control by radio is not described in DE-OS 42 22 237.

SUMMARY OF THE INVENTION

It is an object of the invention to propose a mobile radio system of the above kind with means which permit broadband radio transmission so that the mobile station can be assigned several subscriber channels of different widths.

The object is attained by providing a mobile radio system comprising base stations and a mobile station which is connected with one of the base stations via a radio link, characterized in that the base stations and the mobile station have concentrators connected thereto which operate in the asynchronous transfer mode to combine a plurality of subscriber channels into one transmit channel by statistical time-division multiplexing and to separate a receive channel into the plurality of subscriber channels by statistical time-division demultiplexing.

The object is further attained by a first base station for a mobile radio system with further base stations and with a mobile station which is connected with the base station via a radio link, characterized in that the first base station has a concentrator connected thereto which operates in the asynchronous transfer mode to combine a plurality of subscriber channels into one transmit channel by statistical time-division multiplexing and to separate a receive channel into the plurality of subscriber channels by statistical time-division demultiplexing.

The object is still further attained by a mobile station for a mobile radio system comprising base stations with which the mobile station is connectable via respective radio links, characterized in that the mobile station has a concentrator connected thereto which operates in the asynchronous transfer mode to combine a plurality of subscriber channels into one transmit channel by statistical time-division multiplexing and to separate a receive channel into the plurality of subscriber channels by statistical time-division demultiplexing.

Accordingly, the base stations of the mobile radio system transmit and receive via radio links to and from the mobile station, the base stations and the mobile station having concentrators connected to them which operate in the asynchronous transfer mode to combine a plurality of subscriber channels into one transmit channel by statistical time-division multiplexing and to separate a receive channel into the plurality of subscriber channels by statistical time-division demultiplexing.

Thus, because of the proposed ATM transmission (ATM=asynchronous transfer mode), a broadband radio link is provided between the mobile station and the base stations which is characterized by a flexible number of subscriber channels that may differ in width.

The mobile radio system according to the invention can be used with particular advantage to provide efficient railway mobile radio service, particularly if, according to an advantageous aspect of the invention, ATM is combined with directional radio and common-frequency working.

BRIEF DESCRIPTION OF THE DRAWING

The invention will become more apparent from the following description of an embodiment which is shown schematically in the single figure of the accompanying drawing. The embodiment shown is a broadband railway mobile radio system.

BEST MODE FOR CARRYING OUT THE INVENTION

The figure shows a mobile radio system with base stations arranged along a traffic route. Two adjacent base stations are denoted by BS, BS'. The base stations are connected to a center CTR by an optical fiber OF. The center contains a concentrator SMX connected to the optical fiber, a control computer PC connected to the concentrator, and a data base DB connected to the control computer. To transmit signals in the downstream direction, the concentrator SMX combines subscriber channels 1, 2 to N coming from a telephone network (not shown) into one transmit channel DL. The signals are transmitted over the optical fiber OF to the transmitting base stations BS. The subscriber channels are combined by statistical time-division multiplexing in the asynchronous transfer mode, ATM. For the reception of upstream signals, the concentrator SMX separates a receive channel UL into the plurality of subscriber channels TCH by statistical time-division demultiplexing in the ATM. ATM is known per se from line transmission and is described, for example, in an article by O. Fundneider, "Synchrone Digitalhierarchie und asynchroner Transfermodus", Telekom Praxis, published by Siemens AG, Munich, 4/1994, pages 29–36. The concentrator SMX at the center CTR also connects the control computer PC via control channels to the base stations BS and BS' to control handoff SHO from one base station to another.

The figure further shows a rail vehicle which is moving along a traffic route (not shown). The rail vehicle, henceforth called "train" for brevity, contains a mobile station MS, to which a concentrator SMX is connected. This concentrator SMX, tootcombines a plurality of subscriber channels 1, 2 to N into one transmit signal by statistical time-division multiplexing in the ATM, and separates a receive channel into the plurality of subscriber channels by statistical time-division demultiplexing.

Both the concentrator on the train and the concentrator at the center operate in the baseband. In the transceiver of the mobile station and in the transceiver of the respective base station, the concentrated baseband signals are converted to the RF value and sent to the distant station. The same applies analogously for the receive direction. The mobile station MS is linked with one of the base stations BS via a directional antenna. The base station also has a directional antenna. Thus, broadband radio transmission is possible. In this example, a carrier frequency of 1.5 GHz with a bandwidth of 100 MHz is used in the transmit direction from the base stations to the mobile station MS. In the receive direction from the mobile station MS to one of the base stations, a carrier frequency of 2 GHz with the same bandwidth of 100 MHz is used. The modulation used is QAM (quadrature amplitude modulation).

All base stations use the same carrier frequencies (common-channel operation). Complicated radio cell planning and time-consuming handoff as are required in cellular mobile radio systems are not necessary. For instance, there is no need to monitor the receiving conditions at the base stations, which is generally necessary for a subsequent selection of that base station to which the call is to be handed off. The directional antennas of the base stations point in the direction of travel of the train. The directional antenna of the mobile station points in a direction opposite to the direction of travel. Thus, the radio link P between the mobile station MS and the radio station BS grows longer as the train moves on. For the handoff of a call from one base station BS to the next BS', the following procedure is proposed:

The central station CTR monitors, by means of the control computer PC, the radio link P currently established between the mobile station MS and the base station BS. The control computer PC determines from the propagation delay on the radio link P that the train has moved away from the base station PS and is now in the immediate vicinity of the next base stations BS'. The control computer PC then turns on the receiver of the next base station BS' to monitor incoming signals on the next radio link P'.

If, after this turning on of the next base station BS', reception of a radio signal over the radio link P' is detected, the receiver will attempt to demodulate this signal. The receiver requires a minimum time to synchronize with the incoming signal. During this minimum time, both base stations are on. Once the receiver is in lock with the incoming signal, the transmitter of the next base station BS' is turned on and the radio link P' is established. Then, as soon as the mobile station MS also has acquired lock with the incoming signal, the base station BS is turned off by a signal from the control computer PC.

In this manner, the call is transferred from the radio link P to the next radio link P'. An abrupt interruption of radio communication is not possible, since both links are used simultaneously and on the same frequency for the minimum time required for synchronization. The handoff SHO of the call from one base station BS to the next BS' can thus be referred to as a soft handoff.

Handoff is controlled at the center CTR by monitoring and evaluating the baseband signals in the subscriber channels and/or in the signaling channels. Handoff SHO can thus be accomplished by evaluating digital baseband signals with the aid of, e.g., a so-called soft decision equalizer. The determination that the train has moved to the vicinity of the next base station can be made not only by monitoring the propagation delay but also, for example, by monitoring the receive level or the quality of reception at the base station BS'.

The center further includes a data base DB in which timetable data are stored for the train. These data can also be used to determine whether the train has reached the next base station (position fixing).

The mobile radio system described may be extended to a multicarrier radio system, so that in the event of a failure of transmission on one carrier frequency, switchover to another carrier frequency is possible. Such a system is also suitable for the double or multiple installation of signaling channels to provide redundancy for reliable train control by radio.

While the invention has been described as embodied in a mobile radio system, it is not intended to be limited to this application. Embodiments of the invention are conceivable in which nonlinear areas are served by means of sector antennas. If such areas are very small, such as office areas, directional transmission by means of sector antennas can be dispensed with, because only short links are involved. Furthermore, embodiments are conceivable in which broadband radio transmission is provided for aircraft within a satellite-based and/or terrestrial radio system.

What is claimed is:

1. A mobile radio system comprising base stations (BS, BS') and a mobile station (MS) which is connected with one of the base stations via a radio link (P), wherein:

the base stations (BS, BS') transmit and receive in a common-channel mode of operation;

the base stations (BS, BS') and the mobile station (MS) have concentrators (SMX) connected thereto which operate according to an asynchronous transfer mode to combine a plurality of subscriber channels (TCH) into one transmit channel (DL) by statistical time-division multiplexing and to separate a receive channel (UL) into the plurality of subscriber channels (TCH) by statistical time-division demultiplexing;

the base stations (BS, BS') are arranged along a traffic route on which the mobile station is moving;

the base stations (BS, BS') and the mobile station (MS) have directional antennas connected thereto which are so arranged, relative to each other, that during handoff from one base station (BS) to the next (BS'), the mobile station (MS) is connected to these two base stations for a minimum period required to compensate for different propagation delays on two respective radio links (P, P'), the directional antennas of the base stations pointing in a direction of travel of the mobile station, and the directional antenna of the mobile station pointing in a direction opposite to said direction of travel.

2. A mobile radio system as claimed in claim 1, characterized in that the base stations (BS, BS') and the mobile station (MS) transmit and receive on variable carrier frequencies to keep the transmit channel (DL) and the receive channel (UL) free from radio interference.

3. A mobile radio system as claimed in claim 1, characterized in that the base stations (BS, BS') are connected to a control center (CTR) which controls handoff (SHO) from one base station to the next by turning on the next base station (BS') and turning off said one base station (BS) in such a way that said minimum period elapses between turn-on and turn-off.

4. mobile radio system as claimed in claim 1, characterized in that the control center (CTR) comprises a data base (DB) in which a timetable for the mobile station (MS) moving on the traffic route is stored, and that the control center (CTR) evaluates the timetable for turning on the next base station (BS').

5. A mobile radio system as claimed in claim 4, characterized in that the control center (CTR) evaluates the timetable to fix an order which determines the turning off and turning on of the base stations (BS, BS').

6. A mobile radio system as claimed in claim 1, characterized in that the control center (CTR) comprises a data base (DB) in which a timetable for the mobile station (MS) moving on the traffic route is stored, and that the control center (CTR) evaluates the timetable for turning on the next base station (BS').

7. A mobile radio system as claimed in claim 6, characterized in that the control center (CTR) evaluates the timetable to fix an order which determines the turning off and turning on of the base stations (BS, BS').

8. A base station (BS) for a mobile radio system with further base stations (BS') arranged in sequence along a route and with a mobile station (MS) which is connected sequentially with the base stations via respective radio links (P, P'), wherein:

each base station (BS) has a concentrator (SMX) connected thereto which operates according to an asynchronous transfer mode to combine a plurality of subscriber channels (TCH) into one transmit channel (DL) by statistical time-division multiplexing and to separate a receive channel (UL) into the plurality of subscriber channels (TCH) by statistical time-division demultiplexing, and has a directional antenna which points in a direction of travel of the mobile station and wherein the mobile station has a directional antenna which points in a direction opposite its direction of travel, and, during handoff from one base station (BS) to the next (BS'), the mobile station (MS) is connected simultaneously to these two base stations for a minimum period required to compensate for different propagation delays on two respective radio links (P, P').

9. A mobile station (MS) for a mobile radio system comprising base stations (BS, BS') arranged in sequence along a route, with which base stations the mobile station (MS) is connectable via respective radio links (P,P'), wherein:

the mobile station (MS) has a concentrator (SMX) connected thereto which operates according to an asynchronous transfer mode to combine a plurality of subscriber channels (TCH) into one transmit channel (DL) by statistical time-division multiplexing and to separate a receive channel (TJL) into the plurality of subscriber channels (TCH) by statistical time-division demultiplexing, and has a directional antenna which points in a direction opposite to a direction of travel of the mobile station and wherein each base station has a directional antenna which points in said direction of travel of the mobile station, and, during handoff from one base station (BS) to the next (BS'), the mobile station (MS) is connected simultaneously to these two base stations for a minimum period required to compensate for different propagation delays on two respective radio links (P, P').

* * * * *

UNITED STATES PATENT AND TRADEMARK OFFICE
CERTIFICATE OF CORRECTION

PATENT NO. : 5,914,948
DATED : June 22, 1999
INVENTOR(S) : Matthias Frank

It is certified that error appears in the above-identified patent and that said Letters Patent is hereby corrected as shown below:

At column 4, line 65, please change "4. mobile radio system" to --4. A mobile radio system--.

At column 6, line 18, please change "(TJL)" to --(UL)--.

Signed and Sealed this

Fourteenth Day of December, 1999

Attest:

Attesting Officer

Q. TODD DICKINSON

Acting Commissioner of Patents and Trademarks